(12) United States Patent
Teague et al.

(10) Patent No.: US 10,571,599 B2
(45) Date of Patent: Feb. 25, 2020

(54) METHODS FOR PRECISE OUTPUT VOLTAGE STABILITY AND TEMPERATURE COMPENSATION OF HIGH VOLTAGE X-RAY GENERATORS WITHIN THE HIGH-TEMPERATURE ENVIRONMENTS OF A BOREHOLE

(71) Applicant: Visuray Intech Ltd (BVI), Road Town, Tortola (VG)

(72) Inventors: Philip Teague, Houston, TX (US); Long Yu, Sugar Land, TX (US)

(73) Assignee: VISURAY INTECH LTD (BVI), Road Town, Tortola (VG)

( * ) Notice: Subject to any disclaimer, the term of this patent is extended or adjusted under 35 U.S.C. 154(b) by 0 days.

(21) Appl. No.: 15/955,263

(22) Filed: Apr. 17, 2018

(65) Prior Publication Data
US 2018/0239052 A1    Aug. 23, 2018

Related U.S. Application Data

(60) Provisional application No. 62/486,250, filed on Apr. 17, 2017.

(51) Int. Cl.
*G01V 5/10* (2006.01)
*G01V 5/12* (2006.01)
(Continued)

(52) U.S. Cl.
CPC .............. *G01V 5/10* (2013.01); *G01V 5/12* (2013.01); *H05G 1/20* (2013.01); *G21G 4/02* (2013.01)

(58) Field of Classification Search
CPC .......... G01V 5/10; G01V 5/12; H02M 7/103; H02M 7/5387; H05G 1/12; H05G 1/20;
(Continued)

(56) References Cited

U.S. PATENT DOCUMENTS 4,346,590 A * 8/1982 Brown .................... G01V 5/04
                                                                            250/256
6,649,906 B2 * 11/2003 Adolph .................. G01V 5/101
                                                                            250/269.1
(Continued)

OTHER PUBLICATIONS

Novacap Specification, https://4donline.ihs.com/images/VipMasterIC/IC/NOVA/NOVAS00531/NOVAS00531-1.pdf?hkey=EF798316E3902B6ED9A73243A3159BB0, 2007 (Year: 2007).*
(Continued)

*Primary Examiner* — David E Smith
(74) *Attorney, Agent, or Firm* — Raymond R. Ferrera; Adams and Reese LLP

(57) ABSTRACT

A control mechanism for a high-voltage generator for supplying voltage and current to an electronic radiation source in high-temperature environments is provided, the control mechanism including at least one voltage feedback loop for monitoring the output of the generator; at least one environmental temperature monitor; a control bus; and at least one control processor. A method of controlling a high-voltage generator that powers an electronic radiation source in high-temperature environments is also provided, the method including at least: measuring the output voltage of the generator; measuring the temperature within the generator's environment, using a control mechanism to modify a driving frequency, and using a control mechanism to modify a driving pulse-train, such that changes in properties of the electronic components of the generator as a result of changes in environmental temperature are characterized and the generator's driving signals modified to maintain optimally efficient input parameters for a specific environmental temperature.

26 Claims, 4 Drawing Sheets

(51) Int. Cl.
  *H05G 1/20* (2006.01)
  *G21G 4/02* (2006.01)
(58) Field of Classification Search
  CPC ............ H05G 1/265; H05G 1/32; H05G 1/08; H05G 1/10
  See application file for complete search history.

(56) References Cited

U.S. PATENT DOCUMENTS

| | | | | |
|---|---|---|---|---|
| 2004/0247080 | A1* | 12/2004 | Feda | G01N 23/223 378/101 |
| 2008/0242532 | A1* | 10/2008 | Nishikawa | C04B 35/4682 501/138 |
| 2009/0302868 | A1* | 12/2009 | Feucht | G01D 5/2013 324/654 |
| 2010/0206548 | A1* | 8/2010 | Pisio | E21B 43/26 166/101 |
| 2010/0226156 | A1 | 9/2010 | Hanington | |
| 2014/0043089 | A1* | 2/2014 | Schiller | H03K 17/04206 327/376 |
| 2015/0194871 | A1* | 7/2015 | Hiles | G05F 1/10 250/269.1 |
| 2016/0223704 | A1* | 8/2016 | Donderici | G01V 3/38 |

OTHER PUBLICATIONS

Notification of Transmittal of the International Search Report and the Written Opinion of the International Searching Authority, or the Declaration issued in the corresponding PCT International Application No. PCT/US2018/027986, dated Jul. 13, 2018 (13 pages).

* cited by examiner

METHODS FOR PRECISE OUTPUT VOLTAGE STABILITY AND TEMPERATURE COMPENSATION OF HIGH VOLTAGE X-RAY GENERATORS WITHIN THE HIGH-TEMPERATURE ENVIRONMENTS OF A BOREHOLE

TECHNICAL FIELD

The present invention relates generally to methods and means for accurately controlling the output stability of a generator that controls an electronic radiation source when used in a high temperature environment, such as within the domain of oil and gas well logging.

BACKGROUND

Well or borehole logging is the practice of making an accurate record, known as a well log, of the geologic formations through which a borehole creates a path or conduit. Well logging activities are performed during all phases of an oil and gas well's development; drilling and evaluation, completion, production and abandonment.

The oil and gas industry logs rock and fluid properties to find hydrocarbon-bearing strata in the formations intersected by the borehole. The logging procedure consists of lowering a tool on the end of a wireline into the well to measure the properties of the formation. An interpretation of these measurements is then made to locate and quantify potential zones containing hydrocarbons and at which depths these zones exist.

Logging is usually performed as the logging tools are pulled out of the hole. This data is recorded in real-time via a data connection to the surface logging unit or using a memory unit aboard the tool to create either a printed record or electronic presentation called a well log which is then provided to the client. Well logging is performed at various intervals during the drilling of the well and when the total depth is drilled.

Density logging is the practice of using a specific well logging tool to determine the bulk density of the formation along the length of a wellbore. The bulk density is the overall density of a rock including the density of the minerals forming the rock and the fluid enclosed in the pores within the rock.

A radioactive isotope-based source, usually Cesium 137 ($^{137}$Cs), applied to the wall of the borehole emits gamma rays into the formation so these gamma rays may be thought of as high velocity particles which collide with the electrons of the atoms that compose the formation. At each collision the gamma rays lose some of their energy -to the electrons, and then continues with diminished energy. This type of interaction is known as Compton scattering. A proportion of the scattered gamma rays reach detectors located at fixed distances from the source, and is counted as an indication of formation density.

In oilfield operations isotopes can be lost into the well as a result of the breakage of the logging tool at the risk of being irretrievable. Such events can lead to the closure of the well or measures taken to ensure that radioactive material cannot circulate or permeate out of the well. Indeed, direct contamination and the risk to oilfield workers of dangerous levels of exposure are not uncommon. Although comprehensive control measures are in place, the risk associated with the use of highly radioactive isotopes during oilfield operations will always be present.

As is the nature of radioactive materials, the half-life of the material also determines its useful lifetime. Although density logging tools are calibrated to take into account the reduction in activity of an isotope, the useful life of the isotope is somewhat short-lived. A $^{137}$Cs source will produce only one-half of its initial gamma-ray output after a period of 30 years. Consequently, isotope-based sources require periodic replacement, and the older isotopes disposed of. Disposal requirements include precautions similar to that of normal nuclear waste, such as that produced as a waste product at nuclear power stations.

The typical regulatory limit for the amount of $^{137}$Cs which may be used during a logging operation is a maximum of 1.3 Curie. During density logging operations, a certain number of photons per second are required to enter into the detectors to ensure a high enough statistic for the purposes of data quality consistency and interpretation. As a result, density logging operations are normally performed such that the tool is moved at a rate of 1,800 feet per hour to ensure sufficient photons enter the detectors at any particular depth to offer a data resolution acceptable to the client (typically a repeatability to 0.01 g/cc density). In a 15,000 ft long well, this can translate to just over 8 hours of logging time, bottom to surface (or at least 2 hours in the zone of the reservoir).

Operations cannot currently be performed faster as the speed of logging relates to an acquisition speed proportional to the output of the gamma-source. For safety reasons, the amount of $^{137}$Cs used is capped, with a resultant cap in the minimum amount of time required to perform a log.

Various means have been published purporting to mitigate this issue by using x-ray sources as a substitute for gamma-ray sources. By changing the source from a chemical source, with its known output rate, for an x-ray tube, the output of which is dependent upon a number of factors, e.g., input set voltage, input frequency, number of multiplier stages, the designed peak-peak voltage for each multiplier stage, the capacitance of the ladder, the temperature of the generator, etc., introduces variations into the output of the generator that imperil the ability to achieve the statistical ability required to achieve a repeatability of 0.01 g/cc density.

In some cases, prior art discloses methods to monitor the output radiation of x-ray tubes, and to use the changes in resultant radiation output levels as input modify the input voltage of the generator. However, modification of x-ray output after it has already been produced would not help correct the log data that would already have been detrimentally affected by the changes in x-ray energy/output.

A resistor-based feedback loop may be implemented such that the output potential of the multiplier can be monitored. As the capacitance of the capacitors in the multiplier reduces with ambient temperature, the natural hail ionic frequency of the multiplier will increase as a function of temperature. If the input frequency of the ladder is fixed (which is typical), then the result will be a reduction in the efficiency of the multiplier with increase in ambient temperature, and the output voltage of the generator will reduce. With the exception of NP0, which exhibits a low capacitance per unit volume (and therefore very large in comparison to equivalent value capacitor materials), the majority of capacitor materials that are useful within a downhole tool tend to exhibit a variable capacitance with respect to environmental temperature. Within high-temperature environments the capacitance can degrade to such an extent that efficiency of the high-voltage ladder will degrade such that thermal-runaway and failure can be expected.

None of the prior art teaches of practical methods that can be employed to ensure that the output stability of the x-ray tube remains good enough to perform the critical measurement, while compensating for variations in temperature typical in a tool that is being logged in a borehole. In addition, none of the prior art deals with the effects of temperature on the generator electronics as a separable error input to the control scheme, thereby permitting temperature effects to be controlled independently of other issues affecting the output stability of the generator.

For example, U.S. Pat. No. 3,327,199 to Gardner et al. discloses a DC to DC high voltage power supply system including a transistor chopper DC to AC inverter type circuit and a high voltage output transformer that includes an extra secondary winding, hereinafter referred to as a tertiary winding, which generates a feedback voltage which is proportional to the high voltage output. A passing element, for example, a transistor, is located between the DC input voltage and the DC to AC inverter circuit and is controlled by the voltage generated by the tertiary winding to provide a highly regulated DC input voltage to said inverter circuit. The DC voltage appearing across a tertiary winding rectifier circuit is coupled to a filter circuit comprising capacitors in combination with a temperature compensating resistance.

U.S. Pat. No. 5,023,768 to Collier discloses a high voltage, high power DC power supply that includes a single turn primary winding driven through a resonating capacitor by an AC source having a frequency in excess of about 100 kHz. The primary winding includes a pair of concentric cylindrical metal walls having opposite ends electrically connected to each other. A volume between the walls includes plural secondary winding assemblies, having different axial positions along the walls. Each of the assemblies includes an annular magnetic core surrounding the interior wall, a winding on the core and a voltage-doubling rectifier. DC voltages developed across each secondary winding assembly by the rectifier are added together to provide the high voltage, high power output.

U.S. Pat. No. 5,400,385 to Blake et al. discloses a supply for a high bias voltage in an X-ray imaging system has an inverter and a voltage multiplier that produce an alternating output voltage in response to control signals. A voltage sensor produces a signal indicating a magnitude of the output voltage. A circuit determines a difference between the sensor signal and a reference signal that specifies a desired magnitude for the output voltage and that difference is integrated to produce an error signal. The error signal preferably is summed with a precondition signal that is an approximation of a nominal value for the signal sum and the summation producing a resultant signal. Another summation device arithmetically combines the resultant signal and the sensor signal with a signal corresponding to a one-hundred percent duty cycle of the inverter operation in order to produce a duty cycle command. An inverter driver generates the inverter control signals-that have frequencies defined by the resultant signal and have duty cycles defined by the duty cycle command. A unique state machine is described which generates those control signals.

U.S. Pat. No. 4,641,330 to Herwig et al. discloses of a high voltage supply circuit for an x-ray tube includes a high voltage transformer having a primary side driven by voltage pulses generated by a drive circuit. The drive circuit includes sub-circuits for controlling the pulse repetition frequency, which is selected as equal to a parallel resonant frequency of a high voltage generator connected to the secondary side of the transformer, for the purpose of saving energy. The drive circuit also includes a sub-circuit for controlling the pulse duration, with the filament voltage in the x-ray tube being regulated by this pulse duration.

U.S. Pat. No. 7,564,948 to Wraight et al. discloses of an x-ray source being used as a replacement for a chemical source during density logging along with various means of arranging the apparatus and associated power-supply, also teaches of the means of filtering the primary beam from the x-ray source such that a filtered dual-peak spectrum can be detected by a reference detector which is then used to directly control (feedback) the x-ray tube voltage and current for stability purposes. However, the patent discloses only a compact x-ray device (bipolar) with a grid, a power supply in the form of a Cockcroft-Walton rolled up into a cylinder between two Teflon cylinders in order to save space, and the aforementioned filtered reference detector method.

Finally, U.S. Pat. No. 8,481,919 to Teague teaches a means of creating and controlling the electrical power necessary, by serially stepping up the DC reference and creating high potential field control surfaces, to control either a bipolar or unipolar x-ray tube for the purposes of replacing chemical sources in reservoir logging. The reference also teaches one or more moveable/manipulatable beam hardening filters and rotating light-house collimation on the source, the use of gaseous insulators including SF6 as an electrical insulator in a downhole x-ray generator. However, the reference does not disclose a method of using the increased output of the x-ray device to enable longer offset detectors to enable analysis of the non-invaded zone of the formation. It also fails to teach of a method to increase the permissible count rate within a detector volume by doubling the number of PMTs for a given detector volume.

SUMMARY

A control mechanism for a high-voltage generator for supplying voltage and current to an electronic radiation source in high-temperature environments is provided, the control mechanism including at least one voltage feedback loop for monitoring the output of the generator; at least one environmental temperature monitor; a control bus; and at least one control processor.

A method of controlling a high-voltage generator that powers an electronic radiation source in high-temperature environments is also provided, the method including at least: measuring the output voltage of the generator; measuring the temperature within the generator's environment, using a control mechanism to modify an associated driving frequency, and using a control mechanism to modify an associated driving pulse-train, such that the change in properties of the electronic components of the generator as a result of changes in environmental temperature are characterized and the generator's driving signals modified to maintain optimally efficient input parameters for a specific environmental temperature.

BRIEF DESCRIPTION OF SEVERAL EXAMPLE EMBODIMENTS

The methods and means described herein enable the efficient and stable use of ultra-high voltage generators and electronic radiation sources within the high-temperature environment of a borehole. A control mechanism for a high-voltage generator that powers an electronic radiation source in high-temperature environments is provided, the tool including at least a voltage feedback loop for monitoring the output of the generator, a temperature monitor, a control bus and a control processor.

Figure 1:
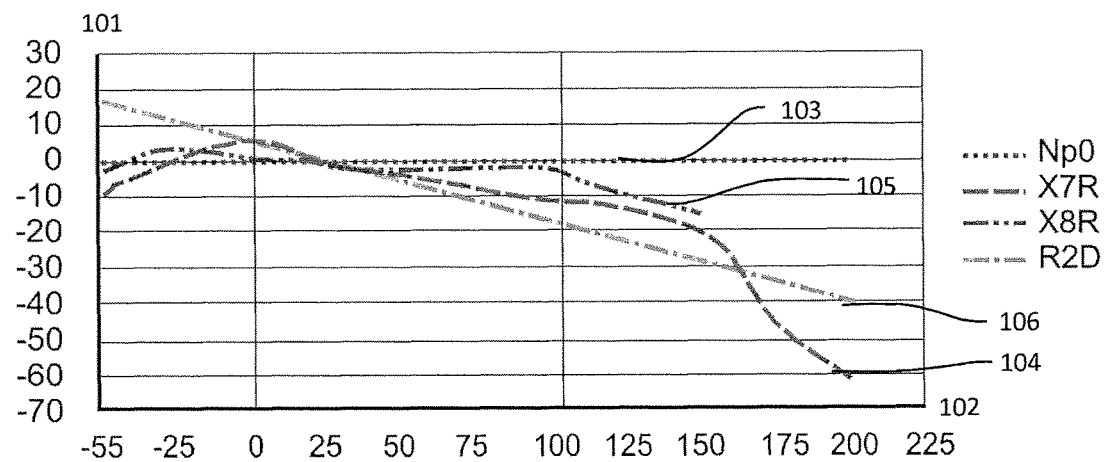
FIG. 1 illustrates the relationship between the capacitance of four different types of capacitor materials and environmental temperature.

With reference now to the attached Figures, FIG. 1 illustrates the relationship between the percentage change in capacitance [101] of four different types of capacitor materials and environmental temperature in degrees Celsius [102]. With the exception of NP0 [103], which exhibits a low capacitance per unit volume, the majority of capacitor materials that are useful within a downhole tool tend to exhibit a variable capacitance with respect to environmental temperature [102]. Within high-temperature environments, typically above 85 degrees Celsius, the capacitance [101] can degrade to such an extent that efficiency of the high-voltage ladder will degrade such that thermal-run-away and failure can be expected.

Figure 2:
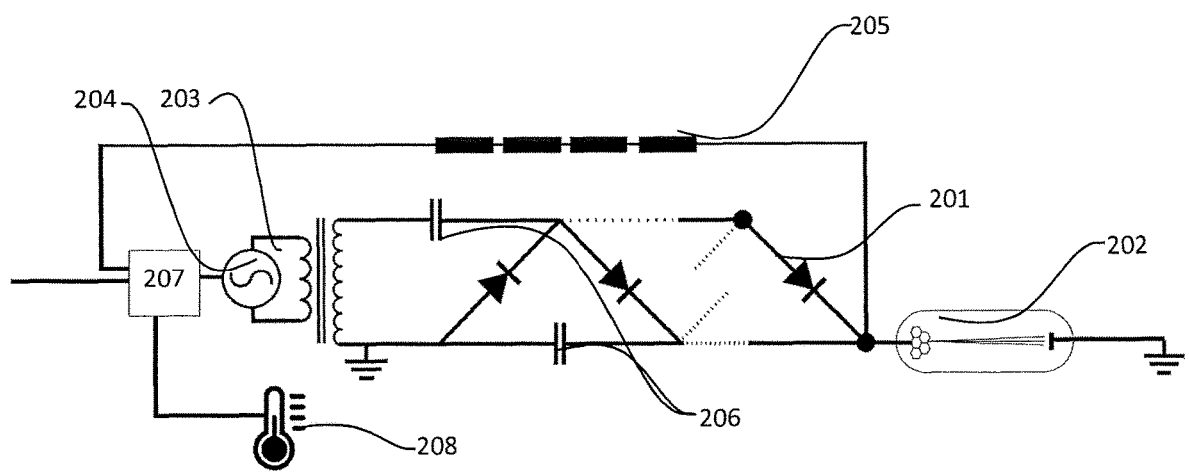
FIG. 2 illustrates a high-voltage generator connected to an electronic radiation source, a resistor-based voltage feedback loop, a temperature sensor, and a control input processor.

FIG. 2 illustrates a high-voltage ladder [201], driving a unipolar electronic radiation source [202] based upon a multistage Greinacher multiplier (Cockcroft-Walton), may be driven by an alternative current waveform [204] that has been generated by a H-bridge circuit [203]. A resistor-based feedback loop [205] may be implemented such that the output potential of the multiplier can be monitored. As the capacitance of the capacitors [206] in the multiplier reduces with ambient temperature, the natural harmonic frequency of the multiplier will generally increase as a function of temperature. If the input frequency of the ladder is fixed (which is typical), then the result will be a reduction in the efficiency of the multiplier with increase in ambient temperature, and the output voltage of the generator will reduce. If a control processor [207] is implemented to control the operating frequency of the driver, the ambient temperature can be monitored [208] and used as an input into the control algorithm. In such a scheme, the drive frequency of the multiplier can be made to increase to match the increasing natural frequency of the multiplier as a function of ambient temperature. The whole generator can be characterized to ascertain the most optimum (efficient) frequency of the ladder as a function of temperature, and that data used to shape the control algorithm, the result being that multiplier efficiency and output voltage remain constant even into high ambient temperature regimes.

Figure 3:
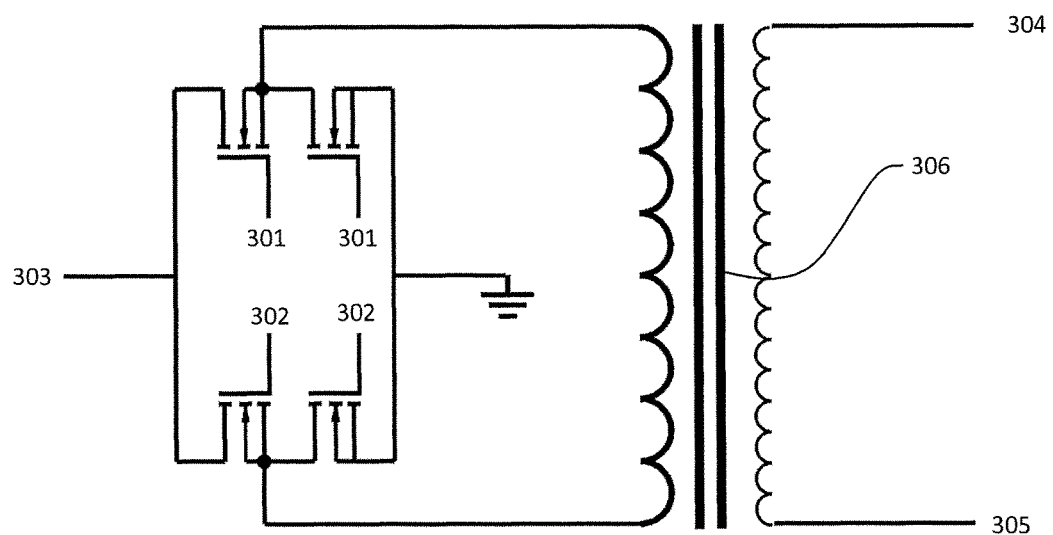
FIG. 3 illustrates a H-bridge configured driving circuit, pulse-width modulated inputs, voltage inputs, ground potential, and an output transformer.

FIG. 3 illustrates a typical H-bridge configured driver using Field Effect Transistors (FETs). The HV in direct-current potential [303] will define the output Peak-peak voltage of the H-bridge into the transformer [306] and consequently, determine the output voltage of multiplier compared to a reference potential [305], such as ground. A processor [207] can be configured such to produce Pulse Width Modulation (PMW) signals to inputs [301, 302] on either side of the H-bridge to control the frequency and duty cycle of the output waveform. The frequency of the output waveform can be the result of an algorithm that uses temperature gauges as an input to determine the optimum resonant frequency for multiplier as a function of ambient temperature.

Figure 4:
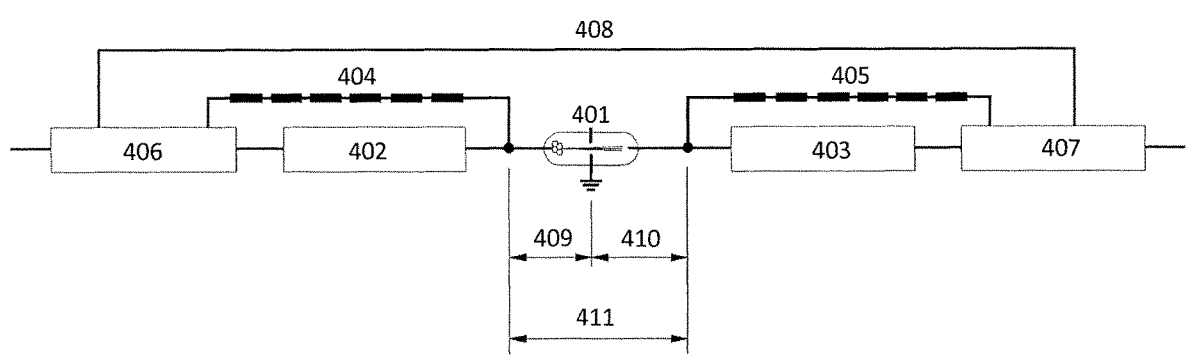
FIG. 4 illustrates two high-voltage generators connected to an electronic radiation source in bi-polar configuration, resistor-based voltage feedback loops, temperature sensors, control input processors, and a communications bus all employed to maintain a consistent potential across the electronic radiation source.

FIG. 4 illustrates a bipolar x-ray source tube [401]. A bi-polar configured electronic source tube does not possess a grounded anode or cathode. As such, the negative [402] and positive [403] generators work together to determine the overall tube potential [411], which is a combination of the output of each multiplier [409, 410]. As the effective load on each multiplier changes as a function of the operating point of the other pole's operating set-point, the potential for chaotic behavior to arise is possible, unless the setpoint for the output of each generator is monitored accurately. One of the two generators' controllers [406, 407] can act as the overall system 'master' and the other as the 'slave'. In this manner, each controller would be responsible of maintaining its own set-point [409, 410] but the control master would ensure that the overall tube potential remains constant by issuing set-point modification instructions over a communications bus [408] between the two generator controllers [406, 407].

Figure 5:
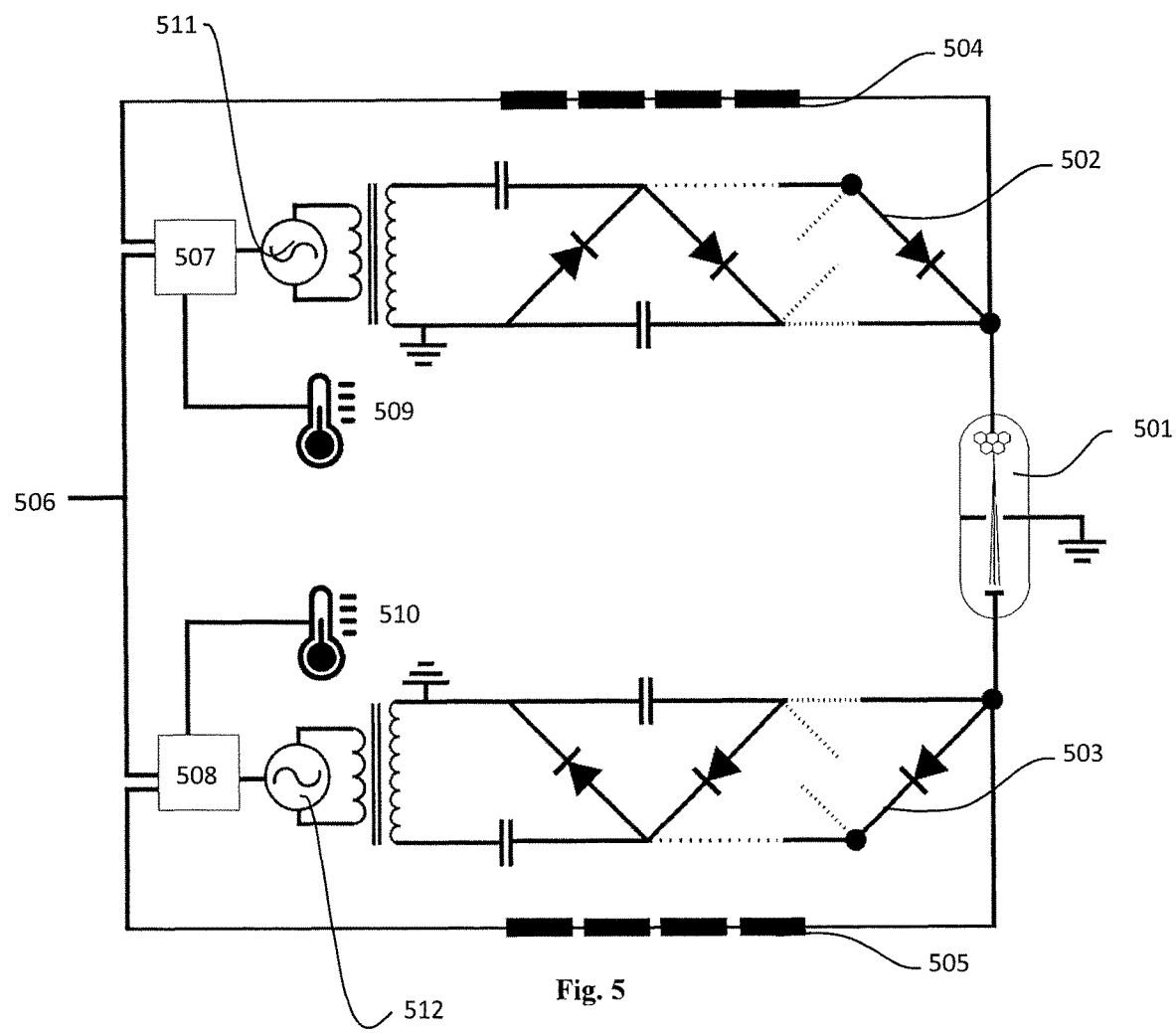
FIG. 5 illustrates two high-voltage generators connected to an electronic radiation source in bi-polar configuration, resistor-based voltage feedback loops, temperature sensors, control input processors, and a communications bus all employed to maintain a consistent potential across the electronic radiation source.

FIG. 5 illustrates an alternative schematic representation of the bipolar configured drive system. As a single pole's generator may contain tens or hundreds of stages, each doubling or tripling the DC potential of the multiplier, it is obvious that controlling the multiplier though modification of the DC input potential to the H-bridge [511, 512] would result in the significant amplification of an variation (or error) in the DC level of the input. In that respect, input DC level modification isn't an optimum control mechanism if very high output potential accuracy is desired. As the responsiveness (or time-base) of the generator is a function of length, capacitance, and operating frequency, it is possible that any output potential feedback or monitoring loop [504, 505] could produce a time-delay into the control system [507, 508]. If correctly filtered, the feedback loop potential can be used for accurate control of the output. As the change in multiplier output as a function of temperature (and therefore, efficiency change) is a separate control dimension to the feedback loop, it would make little sense to attempt to control temperature effects and general output instabilities by real-time control of the DC input level to the multiplier. By characterizing the temperature coefficients of the generator as a separate control dimension, and short-term variations in the output feedback loop can be corrected for directly (as a single dimensional change) by monitoring the environmental temperature [509, 510] and correcting the drive-pulse-chain input parameters from the control processors [507, 508]. The setpoint of each is communicated over the communications bus [506] which links the two generators.

Figure 6:
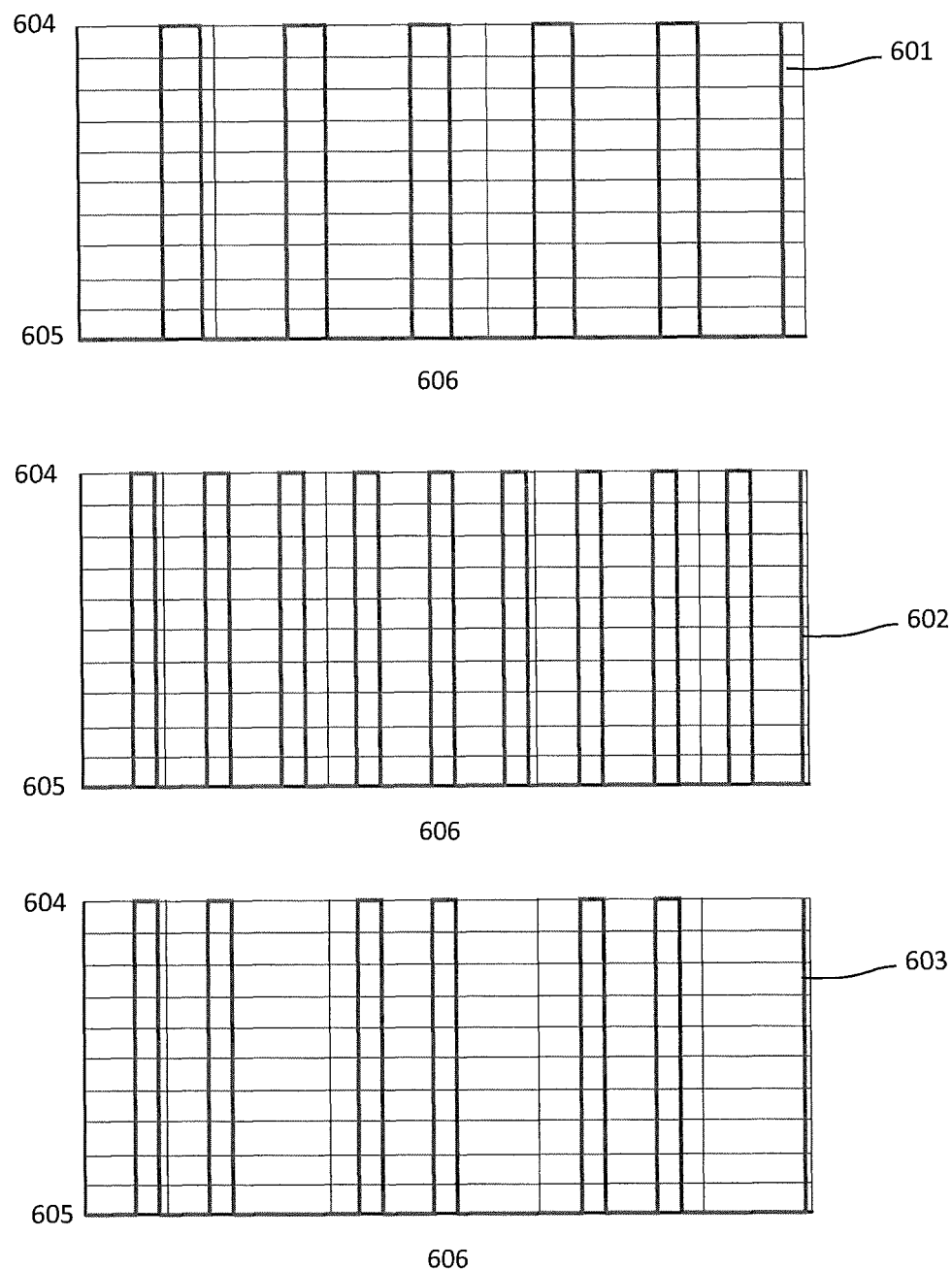
FIG. 6 illustrates three different control-train input profiles examples for pulsed-input modulation of high-voltage generator.

FIG. 6 illustrates three examples of control drive-train inputs shown as high-voltage potential [604] in, referencing ground potential [605], as a function of time [606] in milliseconds. In the first example, a standard control pulse [601] exhibits a 33% duty cycle; the FET being controlled is outputting 33% of the time in a cyclic function. The second example [602] illustrates the effect of increasing the output frequency of the controlling PWM signal, here the duty cycle remains at 33%, however the frequency has been doubled. The third example [603] illustrates one possible embodiment of a modification (or modulation) of the 'pulse-train'. In this example the duty cycle remains at 33%, but every 3rd pulse is skipped such that, for a short period of time, the amount of pulses (and therefore, energy) being delivered into the multiplier is reduced such that the output of the generator will decrease temporarily as a function of the percentage of skipped pulses in the pulse-train over the time period of the total number of pulses at the set operating frequency. The time taken for this control input to reach the output is dependent upon the number of stages in the multiplier and the operating frequency of the multiplier—typically, the time-based of the generator would be operating frequency divided by the number of discrete multiplier stages.

In one embodiment, a high-voltage ladder driving a x-ray tube based upon a multistage Greinacher multiplier (Cockcroft-Walton) is driven by an alternative current waveform that has been generated by a H-bridge circuit consisting Field Effect Transistors (FETs). A resistor-based feedback loop is configured such that the output potential of the multiplier can be monitored directly, and the resultant signal fed (comparator) into a microprocessor. The direct-current input potential (for the FETs) will define the output Peak-peak voltage of the H-bridge into the transformer and consequently, determine the output voltage of multiplier. The input potential to the FETs can be controlled by the controller to make large modifications to the output of the generator, such as a 'start-up' where the output of the generator may be required to change from 0 kV to 300 kV, for example. A processor can be configured such to produce Pulse Width Modulation (PMW) signals to either side of the H-bridge to control the frequency and duty cycle of the output waveform. The frequency of the output waveform is the result of an algorithm that uses temperature gauges as an input to determine the optimum resonant frequency for multiplier as a function of ambient temperature. Said processor is equipped with firmware that controls the input voltage, frequency, duty-cycle and pulse-train configuration of the FET-based H-bridge. As the capacitance value of the capacitors in the multiplier reduces with ambient temperature, the natural harmonic frequency of the multiplier will increase as a function of ambient temperature. As the processor is configured such to control the operating frequency of the H-bridge, the ambient temperature can be monitored and used as an input into a control algorithm. In this embodiment, the drive frequency of the multiplier can be made to increase to match the increasing natural frequency of the multiplier as a function of ambient temperature. The whole generator can be characterized to ascertain the most optimum (efficient) frequency of the ladder as a function of temperature, and that data used to shape the control algorithm. The result being that multiplier efficiency and output voltage remain constant even into high ambient temperature regimes.

In a further embodiment, a bipolar x-ray tube does not include a grounded anode (as the anode is connected to a second 'positive' generator). The negative and positive generators work together to determine the overall tube potential, which is essentially the combined output of the multipliers. As the effective load on each multiplier changes as a function of the operating point of the other pole's operating set-point, the potential for chaotic behavior is possible, unless the setpoint for the output of each generator is monitored accurately. Therefore, one of the two generators' controllers acts as the overall system 'master' and the other as the 'slave.' In this manner, each controller is responsible of maintaining its own set-point but the master ensures that the overall tube potential remains constant by issuing set-point modification instructions over a communications bus that links the two controllers.

In yet another embodiment, a standard control pulse exhibiting a specific duty cycle, i.e., the FET being controlled is outputting a specific percentage of the time in a cyclic function. The output frequency of the PWM signal controlling the ladder may be adjusted by algorithm to compensate for temperature effects in the generator, while the duty cycle remains constant. The firmware in the controller(s) is configured such to affect a modification (or modulation) of the 'pulse-train'.

In another embodiment, the duty-cycle remains at constant but every 25th pulse is skipped such that, for a short period of time, the amount of pulses (and therefore, energy) being delivered into the multiplier is reduced such that the output of the generator decreases temporarily as a function of the percentage of skipped pulses in the pulse-train over the time period of the total number of pulses at the set operating frequency. The time taken for this control input to reach the output is dependent upon the number of stages in the multiplier and the operating frequency of the multiplier—typically, the time-base of the generator is the operating frequency divided by the number of discrete multiplier stages.

In another embodiment, the control algorithm of the processor would determine what short-term changes would need to be made to the output of the multiplier, and effect real-time changes to the pulse train, such as changing from 100/100 equal pulses to 98/100 (where in 1 in 50 are skipped), or where 96/100 equal pulses (1 in 25 skipped) and then reverting to the original set-point as necessary to ensure a highly accurate output stability—changes of a few volts.

In the example embodiments, such stability in operation permits an electronic radiation source to exhibit statistical output stability similar to a chemical source, thereby enabling their use within downhole logging tools where the statistical repeatability of the measurement is paramount. In such cases, high logging speeds are achieved without forsaking statistical repeatability/accuracy over the mission time (or log time) of the logging tool as a function of temperature, which typically varies with depth and mission time.

In the example embodiments, the output of the generator feeding the electronic radiation source remains constant as a function of ambient temperature, regardless of the choice of capacitance substrate in the generator.

In the example embodiments, discrete modification of the pulse-train permits very precise control of the generator output.

In the example embodiments, very accurate digital control by direct quantization of the energy entering the multiplier permits a high-speed control mechanism that is characterizable, such that control of two inter-linked generators (in the case of a bipolar tube) is achievable with a high degree of output stability.

In a further example embodiment, the electronic radiation source controlled by the method is an electronic x-ray source.

In yet another embodiment, the electronic radiation source controlled by the method is an electronic pulsed-neutron generator source.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A control mechanism for a high-voltage generator for supplying voltage and current to an electronic radiation source in high-temperature environments, said control mechanism comprising:
    at least one voltage feedback loop for monitoring the output of the generator;
    at least one environmental temperature monitor;
    a control bus; and
    at least one control processor used to modify a pulse train in order to maintain optimal input parameters based upon the environmental temperature.

2. The control mechanism of claim 1, wherein the mechanism is configured so as to modify a driving frequency of the high voltage generator to match a natural operating frequency of the high-voltage generator at temperatures of at least 85° C.

3. The control mechanism of claim 1, where the mechanism is configured to modify a driving frequency of the high voltage generator to match a multiple of the natural operating frequency of the high-voltage generator at temperatures of at least 85° C.

4. The control mechanism of claim 1, where the mechanism is configured to modify a driving frequency of the high voltage generator to match a harmonic frequency of the natural operating frequency of the high-voltage generator at temperatures of at least 85° C.

5. The control mechanism of claim 1, wherein the electronic radiation source is an x-ray source.

6. The control mechanism of claim 1, wherein the electronic radiation source is a pulsed neutron source.

7. The control mechanism of claim 1, further comprising a capacitor material disposed within the high-voltage generator comprising NP0 substrate.

8. The control mechanism of claim 1, further comprising a capacitor material disposed within the high-voltage generator comprising X7R substrate.

9. The control mechanism of claim 1, further comprising a capacitor material disposed within the high-voltage generator comprising X8R substrate.

10. The control mechanism of claim 1, further comprising a capacitor material disposed within the high-voltage generator comprising R2D substrate.

11. The control mechanism of claim 1, wherein the mechanism is configured to produce non-direct-current output potential waveforms.

12. The control mechanism of claim 1, wherein at least one of the control processors acts as a master controller over at least one other controller within the system.

13. The control mechanism of claim 12, wherein all controller processors are interconnected via an electronic communications bus.

14. The control mechanism of claim 1, wherein at least one controller processor is configured to provide automated start-up and shutdown profiles for the electronic radiation source.

15. The control mechanism of claim 1, further comprising driver electronics comprising a plurality of Field Effect Transistors.

16. A method of controlling a high-voltage generator that powers an electronic radiation source in high-temperature environments, the method comprising:
    measuring an output voltage of the generator;
    measuring a temperature within the generator's environment;
    using a control mechanism to modify an associated driving frequency; and
    using a control mechanism to modify an associated driving pulse-train such that optimal input parameters based upon the environmental temperature's effect on the electronic components of the generator are maintained.

17. The method of claim 16, further comprising monitoring changes in environmental temperature so that changing properties of the electronic components of the generator are characterized and the generator's driving signals modified to maintain optimally efficient input parameters for a specific environmental temperature.

18. The method of claim 16, further comprising configuring the control mechanism to modify the driving frequency of the high voltage generator to match the natural operating frequency of the high-voltage generator at temperatures of at least 85° C.

19. The method of claim 16, further comprising configuring the control mechanism to modify the driving frequency of the high voltage generator to match a multiple of the natural operating frequency of the high-voltage generator at temperatures of at least 85° C.

20. The method of claim 16, further comprising configuring the control mechanism to modify the driving frequency of the high voltage generator to match a harmonic frequency of the natural operating frequency of the high-voltage generator at temperatures of at least 85° C.

21. The method of claim 16, further comprising powering an x-ray electronic radiation source.

22. The method of claim 16, further comprising powering a pulsed neutron electronic radiation source.

23. The method of claim 16, further comprising configuring the control mechanism to produce non-direct-current output potential waveforms.

24. The method of claim 16, further comprising using at least one of the control processors to act as a master controller over at least one other controller within the system.

25. The method of claim 24, further comprising interconnecting all controller processors via an electronic communications bus.

26. The method of claim 16, further comprising configuring the controller processor to provide automated start-up and shutdown profiles for the electronic radiation source.

* * * * *